United States Patent [19]

Rose

[11] 3,818,947

[45] June 25, 1974

[54] EASILY PEELABLE SAUSAGE CASING

[75] Inventor: Henry J. Rose, Danville, Ill.

[73] Assignee: Tee-Pak, Inc., Chicago, Ill.

[22] Filed: Jan. 26, 1972

[21] Appl. No.: 221,034

[52] U.S. Cl................. 138/118.1, 117/95, 117/144, 117/167, 106/243, 426/105, 426/135
[51] Int. Cl............................................. A22c 13/00
[58] Field of Search............... 99/176, 171 CA, 169; 117/167, 144; 106/243, 244; 138/118.1

[56] References Cited
UNITED STATES PATENTS

| | | | |
|---|---|---|---|
| 2,982,660 | 5/1961 | Brissey et al.......................... | 99/176 |
| 3,158,488 | 11/1964 | Firth..................................... | 99/176 |
| 3,266,911 | 8/1966 | Clement................................ | 99/176 |
| 3,442,663 | 5/1969 | Turbak................................. | 99/176 |
| 3,451,827 | 6/1969 | Bridgeford........................... | 99/176 |

OTHER PUBLICATIONS

Furia, Handbook of Food Additives, 1968, pages 413–418.

McCutcheon's Detergents and Emulsifiers, 1971 Annual, page 195.

Condensed Chem. Dict., 7th Ed., pages 765, 766 (1966).

*Primary Examiner*—Morris O. Wolk
*Assistant Examiner*—Sidney Marantz
*Attorney, Agent, or Firm*—Neal J. Mosely; Russell L. Brewer

[57] ABSTRACT

Sausages, such as frankfurters and bolognas, formed in synthetic casings are more easily peeled when the casings are provided with an internal coating of a food grade mineral oil in admixture with an acetylated fatty monoglyceride and about 5 to 30 percent of an alkoxylated type surfactant which is poorly soluble in mineral oil. The coating composition is preferably applied to the interior of the casing as a lubricant during the shirring of the casing on a conventional shirring machine. Other methods of internal coating which are well known in the art may likewise be used for application of the coating solution.

8 Claims, No Drawings

EASILY PEELABLE SAUSAGE CASING

BACKGROUND OF THE INVENTION

FIELD OF THE INVENTION

In the preparation of sausages of various types, ranging from smaller sausages such as frankfurters and viennas up to large sausages such as bolognas, the sausage meat is normally extruded through a stuffing horn into a tubular casing which is formed into links or chubs for processing. In the early days of the meat packing industry, sausages were prepared using natural casing. About 40 years ago, casings were developed of regenerated cellulose which have been used in the preparation of sausages of all sizes. Clear, thin-walled, cellulosic casings were used primarily in the preparation of frankfurters and viennas. The larger diameter, heavy-walled, cellulosic casings, both clear and fibrous reinforced, were used in the manufacture of larger sausages of the bologna type. In the manufacture of both large and small sausages, a major problem has been the difficulty of peeling the sausage casing from the sausage after it has been smoked and cooked by the meat packer. This problem has been especially great in the case of frankfurter sausages because of the high rate of processing sausages.

In the preparation of frankfurters and other small sausages, a sausage paste or emulsion is extruded through a stuffing horn into a shirred sausage casing. The shirred casing would normally contain from 80 to 160 feet of casing in a shirred length of about 10 to 20 inches. The sausage paste or emulsion is extruded into the casing at a high speed with the result that the entire length of the casing is filled with sausage emulsion in a few seconds. As the casing is filled with sausage emulsion it passes into a linking device which twists the casing to form individual links. The encased lengths of sausage are then cooked and smoked and are stored in a refrigerated room for about 24 hours prior to peeling. After extended storage in the chill room the encased sausages are removed into a peeling room which is maintained at a relatively high humidity. The chilled sausage has a considerable amount of moisture condensed on its surface upon removal from the chill room which facilitates removal of the casing from the individual sausages. The sausages are passed through a commercial peeling machine which slits open the casing without cutting the encased meat and removes the casing from the sausage. Sausages which are not separated from the casing by the automatic peeling machinery must be separated by hand which adds to the cost of processing. Normally, if a particular string of sausage is difficult to peel it is returned to the chill room and cooled for an additional period of time to allow the meat emulsion to set up more thoroughly and facilitate casing removal. In the processing of frankfurters and other small sausages, the encased sausages are often given a cold shower of water to soak the casing and assist in peeling.

In Europe, and in certain meat packing plants in the United States, the procedure used in preparation of the frankfurters does not include the storage in the chill room or the shower with cold water. As a result, frankfurters which are prepared by such processes are particularly sensitive to the difficulties which are encountered in peeling the casing from the finished frankfurters. Frankfurters which are made in such processes typically have a very high incidence of peeling problems.

DESCRIPTION OF THE PRIOR ART

The prior art has been concerned with the problem of improving the peelability of synthetic casings from sausages for many years. The attempted solutions to the problem suggested by the prior art have mainly involved the application of various coatings to the inner surface of the sausage casings to permit the casings to be peeled more readily from the sausages. More recent prior art has also included treatments of the casings in various soak baths to modify the interface between the casing and the sausage to improve peelability.

Weingand U.S. Pat. No. 2,709,138 discloses a casing having an internal release coating comprising a fatty isocyanate. Firth U.S. Pat. No. 3,106,471 discloses casings having release coatings of fatty ketenes. Underwood U.S. Pat. No. 2,901,358 discloses casings having release coatings of stearato chromic chloride chemically combined on the inner surface of the casing. Chiu U.S. Pat. No. 3,307,956 discloses release coatings of water soluble silicones. Turbak U.S. Pat. No. 3,442,663 discloses release coatings of water insoluble polymerized silicones applied to the internal surface of the casing as a polymerized methyl hydrogen siloxane.

Bridgeford U.S. Pat. No. 3,451,827 discloses release coatings of lactic acid, calcium lactate, trisodium hexametaphosphate, aluminum sulfate, potassium aluminum sulfate, lecithin diammonium phosphate, carboxy methylcellulose, silicone oil, calcium phytate, inositol, glycerophosphoric acid, acetylatedmonoglycerides, methyl cellulose, cetyl alcohol applied internally to the casing during the mechanical shirring of the casing.

The prior art, as exemplified by the aforementioned patents, has had only limited success in providing easily peelable synthetic casings for frankfurters and other small size sausages. The various coatings disclosed in the prior art are applied to the interior of large size casings, such as those used for bolognas, etc., by a technique which involves the insertion of a slug of coating solution within the casing during manufacture, which slug of liquid coats the interior of the casing as it moves past. This coating technique however is not applicable to the interior coating of frankfurter type synthetic sausage casings because of the very small diameter of such casings and the speed of manufacture which makes it difficult to introduce a coating liquid inside the casing. Coating liquids such as those described in Pat. No. 3,307,956 may be added from the outside of the casing in aqueous solution. However, the silicone coating materials which are water soluble or soluble in aqueous alkali are not approved coating materials for use with meat or other food products and interfer with shirring at levels required for good peelability. Coating materials of the type disclosed in U.S. Pat. Nos. 3,442,663 and 3,451,827 may be applied to small diameter casings during mechanical shirring of the casing on a shirring machine. The application of coatings during shirring however is somewhat irregular and often results in an interior coating which is incompatible in coverage and quite variable in thickness. A further problem encountered with internally coated casings is that certain types of coatings interact with the sausage emulsion and result in the formation of unsightly fat pockets or produce a mottled surface appearance which is unacceptable commercially.

SUMMARY OF THE INVENTION

This invention is based upon the discovery that artificial sausage casings, particularly casings of regenerated cellulose, both of the clear cellulose and fibrous-reinforced types, are peeled much more easily from sausages processed in the casing when coated on the inner surface with a food grade mineral oil in admixture with an acetylated fatty monoglyceride, and about 5 to 30 percent wt. of an alkoxylated type surfactant which is poorly soluble in mineral oil. The coating solution is preferably used as a lubricant for the casing internally during the shirring of the casing on an ordinary commercial shirring machine. The coating solution is applied to the inner surface of the casing during shirring in an amount ranging from 0.0001 to 1.0 percent wt. based on the casing. A preferred coating application is in the range from about 0.2 to 0.6 wt.

DESCRIPTION OF THE PREFERRED EMBODIMENTS

In the manufacture of regenerated cellulose sausage casings, viscose is extruded through an annular die into a coagulating and regenerating bath to produce a tube of regenerated cellulose. The tube is subsequently washed, plasticized with glycerin, and dried while inflated under a substantial air pressure for size control. After drying, the casing is wound on reels and subsequently shirred on high speed shirring machines, such as those described in U.S. Pat. Nos. 2,010,626; 2,583,654; 2,722,714; 2,722,715; 2,723,201; etc. Reinforced cellulose casing also known as fibrous casing is prepared by forming a tube of a long fiber hemp paper, or the like, impregnating the tube with viscose, and regenerating cellulose in and on the paper tube. The viscose-impregnated tube is passed into a coagulating and regenerating bath and then subsequently washed, plasticized with glycerin and dried under air pressure. The fibrous casing is used largely for the production of large sausages such as bolognas. Large diameter clear unreinforced regenerated cellulose casing is also used in the production of large bologna type sausages. Fibrous casing and the large clear cellulosic casings are normally sold as flat stock, either in the form of reel stock or cut into pieces of predetermined length. Recently, fibrous casing and the large clear cellulosic casings have been shirred on commercial shirring machines modified to handle the larger sizes.

I have found that cellulosic casings, and other synthetic sausage casings, viz. paper, alginate, polyvinyl alcohol, paper reinforced collagen, etc., are more easily peeled from sausages processed therein if the inner surface of such casings are coated with a mixture of a mineral oil and an acetylated fatty monoglyceride containing from about 5 to 30 percent wt. of an alkoxylated type surfactant or emulsifier which is characterized by being poorly soluble in mineral oil. The acetylated fatty monoglyceride functions as a co-solvent, for the mineral oil and the surfactant or emulsifier.

Preferred coating compositions comprise mineral oil in admixture with the surfactant or mineral oil and up to an equal amount by weight of an acetylated fatty monoglyceride, the mixture being admixed with the desired amount of the surfactant.

Typical examples of the acetylated fatty monoglycerides which are useful in this invention include the diacetylated fatty monoglycerides, where the fatty acid in the monoglyceride is a $C_8 - C_{24}$ straight chain or branched chain, saturated or mono or di unsaturated fatty acid. The surfactants which are used in the coating composition are ones which are poorly soluble in mineral oil and are usually alkoxylated emulsifiers such as: glycerol polyethoxy (20) monostearate; dodecyl polyethoxy (5) phenol; ethoxylated (6) vegetable oil; glycol polyethoxy (8) monostearate; polyglycol monooleate; polyglycerol monooleate; polyethylene glycol (400) monolaurate; propylene glycol monoleate; polyethylene glycol (600) monolaurate; polypropylene glycol monostearate; polyglycerol monostearate; sorbitan polyethoxy (5) monooleate; sorbitan polyethyoxy (20) trioleate; sorbitan polyethoxy (20) monostearate; polyethylene glycol (20) monopalmitate; sorbitan (polyethoxy (4) monolaurate.

In the case of small diameter clear cellulosic casings to the type used in the production of frankfurters or weiners, the coating solution is used as an internal lubricant during shirring. The coating solution is introduced through the mandrel on a commercial shirring machine and is applied to the inner surface of the casing at a concentration ranging from 0.0001 to 1.0 percent wt., preferably about 0.2 to 0.6 percent wt. In larger diameter casings, the coating solution may be applied internally in the form of a slug of liquid inserted within the casing to coat the inner surface thereof prior to drying. The casings having an inner surface of this coating composition peel much better from both small and large sausages and are quite resistant to the formation of undesirable fat pockets in the sausage or the formation of an undesired mottled surface appearance.

In testing the efficacy of this invention, a variety of casings were coated internally with one or more coating compositions of the type described above and were evaluated for ease of peeling from sausages processed therein.

The following non-limiting examples are illustrative of the scope of this invention:

EXAMPLE 1

A coating composition was prepared comprising 40% wt. food grade mineral oil (N.F. No. 9); 40 percent wt. acetylated glycerol monooleate (Myvacet 9-45); and 20 percent wt. polyethylene glycol (400) monostearate.

A clear regenerated cellulose casing of the type used for the processing of frankfurters or wieners was shirred on a commercial shirring machine while introducing a uniform internal coating of the coating solution. The solution was introduced through the mandrel of the shirring machine and was applied as a uniform coating on the inside of the casing. The solution was fed through the mandrel at a rate sufficient to apply an internal coating in an amount of 0.5 percent wt. based on the weight of the casing.

The casings coated as described above when stuffed with frankfurter emulsions and linked, smoked, and cooked, peel readily from the finished frankfurter. These casings have from 20 to 100 percent fewer peeling misses, using a commercial casing peeler, as compared with untreated controls or with controls containing only an internal coating of mineral oil or an acetylated monoglyceride. The frankfurters processed in casings coated in accordance with this example are characterized by being almost totally free from formation of unsightly fat pockets or surface mottling, which occur with control casings or with other release coatings.

EXAMPLE 2 – 17

A series of coating compositions are prepared comprising admixtures of mineral oil and various alkoxylated emulsifiers and acetylated fatty monoglycerides. The various compositions are listed in Table I below.

TABLE 1

| Ex. No. | Surfactant & Amount | Mineral Oil | Acetylated Fatty Monoglyceride* |
|---|---|---|---|
| 2 | 10% wt. glycerol polyethoxy (20) monostearate | 45% wt. | 45% wt. |
| 3 | 10% wt. dodecyl polyethoxy (5) phenol | 45% wt. | 45% wt. |
| 4 | 25% wt. polyethoxy (6) vegetable oil | 40% wt. | 35% wt. |
| 5 | 30% wt. polyethylene glycol (400) monostearate | 50% wt. | 20% wt. |
| 6 | 5% wt. polyglycerol monooleate | 50% wt. | 45% wt. |
| 7 | 5% wt. polyglycol monooleate | 50% wt. | 45% wt. |
| 8 | 20% wt. polyethylene glycol monolaurate | 40% wt. | 40% wt. |
| 9 | 15% wt. propylene glycol monooleate | 45% wt. | 40% wt. |
| 10 | 20% wt. polyethylene glycol (600) monolaurate | 40% wt. | 40% wt. |
| 11 | 10% wt. polypropylene glycol monostearate | 45% wt. | 45% wt. |
| 12 | 20% wt. polyglycerol monostearate | 40% wt. | 40% wt. |
| 13 | 10% wt. sorbitan polyethoxy (5) monooleate | 50% wt. | 40% wt. |
| 14 | 25% wt. sorbitan polyethoxy (20) trioleate | 40% wt. | 35% wt. |
| 15 | 20% wt. sorbitan polyethoxy (20) monostearate | 40% wt. | 40% wt. |
| 16 | 10% wt. sorbitan polyethoxy (20) monopalmitate | 40% wt. | 50% wt. |
| 17 | 20% wt. sorbitan polyethoxy (4) monolaurate | 40% wt. | 40% wt. |

*Myvacet 9–45 unless otherwise specified.

The coating compositions described above are used as lubricants in the shirring of cellulosic frankfurter casings. The coating solutions are applied internally through the mandrel on the shirring machine at concentrations ranging from 0.0001 to 1.0 percent wt. based on the casing. Preferred coating levels are in the range from 0.2 to 0.6 percent wt. based on the weight of the casing. Casings which are internally coated with these compositions have substantially improved peelability as compared with untreated controls and with controls having only an internal coating of mineral oil. Casings which are coated with these coating compositions peel more readily from frankfurters or wieners processed therein and have a markedly less tendency toward development of unsightly fat pockets or mottling on the surface of the sausages, as compared with other release agents.

EXAMPLE 18

A fibrous cellulose casing is prepared as described in various prior patents, such as firth U.S. Pat. No. 3,106,471. A coating solution as described in Example 1 is placed as a slug of liquid inside a portion of fibrous casing. As the fibrous casing is moved past the liquid slug, the inner surface of the casing is coated with about 0.2 to 0.6 percent of the solution. The solutions described in Table I may also be used in coating fibrous casing internally. The casing is dried while inflated under air pressure and subsequently used in the production of bologna sausages. Coated casings of this type require substantially less force to strip the casing from the surface of a finished sausage as compared to untreated controls. Also, there is a substantially lower incidence of fatting out and mottling in sausages prepared using these casings.

I claim:

1. A process for treating an artificial sausage casing to improve the peelability of the casing from a sausage processed therein consisting of applying to the inner surface of said casing a coating of 0.0001 to 1.0 percent wt., based on the weight of the casing, of a coating composition comprising a food grade mineral oil admixed with 5 to 30 percent wt. of an alkoxylated emulsifier which is poorly soluble in mineral oil, and an amount from about 20 to 50 percent by weight of an acetylated fatty monoglyceride as a co-solvent sufficient to dissolve said alkoxylated emulsifier and mineral oil in a homogeneous solution.

2. A process according to claim 1 in which said emulsifier is glycerol polyethoxy (20) monostearate, dodecyl polyethoxy (5) phenol, polyethoxy (6) vegetable oil, polyethylene glycol (400) monostearate, polyglycerol monooleate, polyglycol monooleate, polyethylene glycol monolaurate, propylene glycol monooleate, polyethylene glycol (600) monolaurate, polypropylene glycol monostearate, polyglycerol monostearate, sorbitan polyethoxy (5) monooleate, sorbitan polyethyoxy (20) trioleate, sorbitan polyethoxy (20) monostearate, sorbitan polyethoxy (20) monopalmitate or sorbitan polyethoxy (4) monolaurate.

3. A process in accordance with claim 1 in which the casing is of regenerated cellulose or regenerated cellulose reinforced with a fibrous material.

4. A process in accordance with claim 1 in which the coating composition is applied to the inner surface of the casing while shirring the casing.

5. A process in accordance with claim 1 in which the coating solution is applied to the inner surface of the casing in the form of a slug of liquid inserted into the casing which coats the casing as the casing is moved past the slug of coating liquid.

6. An artificial sausage casing having its inner surface coated with 0.0001 to 1.0 percent of a coating composition comprising a mineral oil admixed with 5 to 30 percent wt. of an alkoxylated emulsifier which is poorly soluble in mineral oil and an amount from about 20-50% by weight of a fatty monoglyceride sufficient to dissolve said alkoxylated emulsifier and said mineral oil.

7. An artificial sausage casing in accordance with claim 6 in which the emulsifier is an glycerol polyethoxy (20) monostearate, dodecyl polyethoxy (5) phenol, polyethoxy (6) vegetable oil, polyethylene glycol (400) monostearate, polyglycerol mooleate, polyglycol monooleate, polyethylene glycol monolaurate, propylene glycol monooleate, polyethylene glycol (600) monolaurate, polypropylene glcyol monostearate, polyglycerol monostearate, sorbitan polyethoxy (5) monooleate, sorbitan polyethoxy (20) trioleate, sorbitan polyethoxy (20) monostearate, sorbitan polyethoxy (20) monopalmitate or sorbitan polyethoxy (4) monolaurate.

8. An artificial sausage casing in accordance with claim 6 in a shirred form.

* * * * *